US 8,346,209 B2

(12) United States Patent
Dababneh et al.

(10) Patent No.: US 8,346,209 B2
(45) Date of Patent: Jan. 1, 2013

(54) REMOTE METER READING USING THE EXISTING MOBILE NETWORK

(75) Inventors: Maher Dababneh, Amman (JO); Fadi Salem Botrous Batarseh, Jerash (JO); Mohammed Ghazi Hassan Abusafieh, Jerash (JO)

(73) Assignees: King Abdullah II Fund for Development, Amman (JO); Maher Dababneh, Amman (JO); Fadi Salem Botrous Batarseh, Jerash (JO); Mohammed Ghazi Hassan Abusafieh, Jerash (JO)

( * ) Notice: Subject to any disclaimer, the term of this patent is extended or adjusted under 35 U.S.C. 154(b) by 775 days.

(21) Appl. No.: 11/513,295

(22) Filed: Aug. 29, 2006

(65) Prior Publication Data
US 2007/0055640 A1 Mar. 8, 2007

Related U.S. Application Data

(60) Provisional application No. 60/712,690, filed on Aug. 29, 2005.

(51) Int. Cl.
*H04M 11/00* (2006.01)

(52) U.S. Cl. .................. 455/405; 455/414.1; 455/414.2; 455/414.3; 455/414.4; 455/466; 455/420; 340/870.02; 340/870.11; 340/10.41

(58) Field of Classification Search .... 455/414.1–414.4, 455/466, 420; 340/870.07; 705/412, 1
See application file for complete search history.

(56) References Cited

U.S. PATENT DOCUMENTS

| 6,747,571 | B2 * | 6/2004 | Fierro et al. | 340/870.02 |
| 6,820,049 | B1 * | 11/2004 | Monroe et al. | 703/21 |
| 6,900,737 | B1 * | 5/2005 | Ardalan et al. | 340/870.02 |
| 7,202,800 | B2 * | 4/2007 | Choi | 340/870.02 |

FOREIGN PATENT DOCUMENTS

WO  WO 2005/038739 A1 *  4/2005

* cited by examiner

*Primary Examiner* — Rafael Perez-Gutierrez
*Assistant Examiner* — Lameka J. Kirk
(74) *Attorney, Agent, or Firm* — Abelman, Frayne & Schwab

(57) ABSTRACT

A system and method remotely monitor a plurality of meters in a non-wireless service network using a wireless system transmitting short message service messages separate from the non-wireless service network. The system includes a query computer for generating a query message including a command to a selected meter of the plurality of meters, for processing a reply message from the selected meter, with the reply message including a response to the command from the selected meter, and for storing the response in a memory; and a wireless telecommunications network for transmitting completely wirelessly the query message and for transmitting the reply message completely wirelessly from the selected meter to the query computer, for remotely and wirelessly monitoring at least the selected meter in the non-wireless service network. The response in the reply message includes data in a SMS message in a Global System for Mobile Communications format.

2 Claims, 10 Drawing Sheets

| City ID/Zone ID | Address ID | Reading |
|---|---|---|
| 1048 | 1050 | 1052 |

FIG. 12

| 0015 | 962777887492 | 06821359 |
|---|---|---|
| 1054 | 1056 | 1058 |

FIG. 13

REMOTE METER READING USING THE EXISTING MOBILE NETWORK

CROSS-REFERENCE TO RELATED APPLICATIONS

This application is related to U.S. provisional patent application No. 60/712,690, filed on Aug. 29, 2005, which is incorporated herein by reference in its entirety.

BACKGROUND OF THE INVENTION

1. Field of the Invention

This invention relates to telecommunications, and in particular to a system and method for utilizing existing telecommunications resources of a mobile network to provide additional services to an existing second network of a utility through the transferring of utility meter readings completely wirelessly over a mobile network.

2. Description of the Related Art

Service applications such as utilities typically employ land-line based networks to convey the services, such as electricity, gas, or water. However, usage by customers of such services is monitored by human operators dispatched to the individual location or residence of the customers to read a meter associated with usage of the services. Such human operators are prone to error in recording the usage, and the timing of their recordation is random, depending on their routes, the weather, and other human factors.

A need exists for a remote meter reading system which does not depend on human operators.

In a mobile telecommunications switching network, mobile stations may be used in static applications such as telemetry of components in the network. Digital cellular networks provide full national coverage of a designated served area, and similar coverage applies for any utility services representing a land line network, as in electricity, gas, or water. A Global System for Mobile communications (GSM) is one example of such mobile telecommunications networks which provides services other than cellular voice services. One of these important services is known as Short Message Service (SMS). In general, the SMS uses short message packets that are employed for the same aim as that of a signaling mechanism.

Once deployed, telecommunication systems are limited by their intended use determined by their infrastructure. Accordingly, to provide new or additional services to enhance functionality for users and to compete with newer systems and new technologies, existing telecommunication systems must be significantly altered at considerable cost and with increased complexity.

Similarly, existing applications using a second network, such as a communication infrastructure of an application, such as utilities, are also limited by their intended use determined by their infrastructure. Accordingly, such applications are unable to provide new or additional services to enhance functionality for users without significant alteration at considerable cost and with increased complexity.

A need exists for adapting existing and limited telecommunication systems to provide new and/or additional services to a second network of an application without significantly altering the established infrastructures, without incurring considerable costs for implementing such services, and without significantly increasing the complexity of the telecommunication system.

BRIEF SUMMARY OF THE INVENTION

The present invention may be readily and easily used in relation to existing mobile telecommunication systems and networks having components that are statically employed, such that the existing telecommunication systems may be adapted to provide new and/or additional services to a second network, such as a dedicated communication network employed in an application, such as a utility. The present invention basically employs such telecommunication networks in telemetry utility and data applications using the simplest techniques of interconnecting two independent networks that provide two different services; that is, a telecommunications network and a second network of the utility, without any major modification in any of their infrastructures, yet capable of providing novel services that were not originally planned to be in any of them. The present invention uses the interconnecting process to take advantage of creating a compatible medium for transferring data between these two independent networks.

The present invention presents the concept of using SMS as a transportation tool of any sort of data to and from different destinations within the GSM coverage area, for obtaining several remote units readings and their different statuses, and other controlling and displaying functions.

Accordingly, it is an objective of the present invention to utilize the existing mobile network more effectively by creating extra traffic load through a SMS to interrogate and obtain meter readings of a second network of an application. The present invention has the ability to utilize a single SMS message to interrogate a number of meters and to obtain a pre-assigned set of readings for a number of meters dedicated to a single mobile number to serve them.

The present invention aims to introduce modern technology and multimedia services into every home in any selected country using the already installed infrastructure of a second network such as a utility, such that the present invention enhances the use of such technology by people in the country and which reflects positively on the attitudes of the people and hence society over the new era of information technology (IT).

The present invention also aims to reduce distance, time, human efforts, errors, and costs for introducing new and more modern technology and multimedia services into every home. In the example of employing the present invention in utility systems such as electricity, water, and gas companies, the present invention obtains readings from meters of such utilities and transmits such readings over a SMS message for improved customer service, such that the present invention saves on money for employing human operators which may instead be used in improving the billing operations and services provided to the customers of such utilities.

Hence, the present invention has a novel feature of utilizing the existing resources of telecommunication systems and networks to enhance the operation of a second and different network, such as a utility, through the completely wireless transferring of utility meter readings over the local mobile network. The operations and advantages of the present invention are achieved by sending an SMS message to the data center of the second network for processing and hence generating the bill. Therefore, messaging services are used primarily to interrogate an immobile GSM Meter Unit (GMU) for data acquisition purposes through which the meter reading is extracted. The meter readings are then conveyed over the GSM network via the SMS to a pre-assigned Billing Office (BO).

The present invention also provides the possibility of serving a number of meters and providing readings over a single message, making use of the fact that, for example, a GSM SMS message contains 160 ASCII characters. Accordingly, the length of each SMS packet may be used to multiplex a number of readings of a number of utility meters into a single SMS message by pre-assigning a sufficient number of digits for each GMU. Let M be the number of characters assigned for each reading for each meter, then the total number N of GMUs which may be accommodated in a single SMS message is:

$$N=160/M$$

A host computer, located at the BO, uses SMS to contact one or more immobile GMUs using a mobile link. The process starts with the host computer sending a short message to one or more GMUs. The SMS message involves a request such that each of the GMUs accordingly transmits certain information back to the host computer via a built-in GMS modem of each meter.

The host computer at the BO is capable of communication either with a single GMU, or with a group of GMUs. A group of GMUs may either be connected to a single GMS modem or each member of the group may have its own GMS modem, depending on the application or second network involved, such as a utility. Such use of one or more GMS modems may result in reducing the excessive traffic load of the second network to provide more reliable and faster communication within the second network.

The utilization of the GSM mobile network of an application is to provide services that were not initially part of the design of the infrastructure of the second network employed by a utility. The merging process and interconnection technique between a GMS wireless network and a national land network enable information and data to be exchanged freely between the two networks. A single SMS message may be used to convey data between the two networks involving one or more nodes on the land network.

Therefore, the present invention allows for reduction of the number of SMS messages needed to extract the landline network data. Also, the present invention eliminates the intervention of human or any physical means or contacts for acquiring such information, which in turn reduces the possibility of normal human error and reduces the bill cost greatly. The present invention also allows the billing and management system of the utility to individually contacts the residents and customers of the utility, resulting in a new, more effective means of service and advertising, thus creating the opportunity to generate and enhance extra business for all involved, such as providers of the utility, outside service providers, and advertisers.

The present invention is quite versatile, and may be deployed in any data acquisition or metering systems for control and observation purposes. The automatic data acquisition techniques ensure that meter readings are transferred reliably and error free in accordance with the GSM reliability capability.

Furthermore, another advantage of the present invention is to utilize the existing digital cellular GSM infrastructure without any additions, modification, or extra components or infrastructure, while providing new and unaccounted-for services. Since the GMUs are stationary or fixed in space geographically, a great deal of processing load involved in the mobility management of existing human meter readers is no longer required, since such processing load is already an existing feature of the GSM network. Such existing processing load capacity in turn reduces the processing overhead on the GSM network, although extra business and traffic load is created for the GSM operators and the utility suppliers alike.

Also, another advantage of the present invention is through the utilization of SMS text length that is used to represent a number of readings of meters, thus spreading the cost of the SMS message over the number of meters via the immediate reduction in the required number of sent SMS messages. Such benefits of improved data acquisition reflect positively on the overall cost of utility meter data acquisition and billing operations, which on the other hand also reduces the overall traffic load while maintaining proper service performance.

A system and method remotely monitor a plurality of meters in a non-wireless service network using a wireless system separate from the non-wireless service network. The system includes a query computer for generating a query message including a command to a selected meter of the plurality of meters, for processing a reply message from the selected meter, with the reply message including a response to the command from the selected meter, and for storing the response associated with the selected meter in a memory; and a wireless telecommunications network using a predetermined communication protocol for transmitting completely wirelessly the query message from the query computer to the selected meter and for transmitting the reply message completely wirelessly from the selected meter to the query computer, for remotely and wirelessly monitoring at least the selected meter in the non-wireless service network. The predetermined communication protocol is the short messaging service (SMS) protocol. The query message and the reply message are SMS messages. The response in the reply message includes data in a SMS message in a Global System for Mobile Communications (GSM) format. The non-wireless service network is a utility supply network for applications selected from the group of residential applications and industrial applications. The utility supply network is selected from the group of electrical, water, gas, commodity, or goods. The wireless telecommunications network is selected from the group of a Global System for Mobile Communications (GSM) network, a Digital Enhanced Cordless Telecommunications (DECT) network, or a wireless network which supports short messaging service (SMS) and messaging services.

A method collects and transfers utility meter reading data from a utility network completely wirelessly through a mobile communication network, with the utility network being non-wireless and immobile and located within the vicinity of the service area of the mobile communication network. The method includes the steps of generating, at a computing device, a query short message services (SMS) message for a meter, with the computing device being external to the mobile telecommunications network using an SMS infrastructure; identifying a selected wireless device in the mobile telecommunications network with the wireless device associated with the meter, with the selected wireless device accessible by the SMS infrastructure to transmit and receive SMS messages using a service area identification code and a mobile station code; transmitting from the computing device the query SMS message wirelessly to a network switching center (SC) associated with the service area identification code, wherein the SMS message is transmitted through a network Home Location Register (HLR); and forwarding the query SMS message from the network switching center to the selected wireless device; and sending telemetry associated with the meter from the wireless device to the computing device, thereby remotely and completely wirelessly monitoring the meter in the non-wireless and immobile utility network.

The method further includes the steps of: generating, at the computing device, the query SMS message including a identification number associated with the meter; transmitting the query SMS message from the computing device to the SMS center; and generating, in the SMS center, the query SMS message with the service area identification code and the mobile station code.

A method processes a query message from a host computer by a Global System for Mobile (GSM) communications based meter unit (GMU) associated with a meter in a non-wireless network. The method includes the steps of: receiving the query message transmitted wirelessly from the host computer at the GMU by a GSM modem using a short message service (SMS), with the message including a service area identification number and a GMU identification code; analyzing, at the GMU, a body of the message for a code command; performing an action at the meter corresponding to the received code command; generating a reply message at the GMU for a billing office host computer (BOHC), with the reply message including information responding to the received code command; transmitting the reply message with the GMU identification code as a SMS message to a SMS service center; reformatting, in the SMS service center, the reply message to be associated with the service area identification number and the GSM identification code; and transmitting the reformatted reply message to the BOHC.

The step of performing the action corresponding to the code command is selected from the group of: extracting a recent meter reading; switching ON/OFF a service associated with the meter; and acknowledging meter status. The method further includes the steps of: periodically transmitting the query message from the host computer to the GMU; and periodically transmitting the reformatted reply message containing a recent meter reading to the BOHC. The steps of periodically transmitting are performed each week or performed once per month.

The method further includes the steps of: receiving the reformatted reply message at the BOHC; extracting a meter reading, the service area identification number, and the GMU identification code from the reformatted reply message; and storing data the meter reading in a database according to the GMU identification code.

A method performs a Bill Sending Upon Request (BSUR) operation for customer billing for service to meters in a non-wireless network through a mobile communications network using short message services (SMS) routing to a billing office center of the non-wireless network. The method includes the steps of: generating a query for the billing office center by a Customer Mobile Station (CMS) associated with a customer of the service using a SMS message which includes a service area identification number and a billing office center identification code; transmitting from the CMS the SMS message wirelessly to a network Switching Center (SC) associated with the service area identification code, with the message being transmitted though a network Home Location Register (HLR), bypassing a subscriber record in the network HLR; and forwarding the SMS message from the SC to the billing office.

The method further includes the steps of: assigning an identification of the billing office center for receiving the SMS message; generating, at a Customer Mobile Station (CMS), the SMS message including the identification; transmitting the SMS message including the identification code from the CMS to a short message service center (SMSC); and generating, in the SC, the message for the billing office center associated with the identification of the billing office and the billing office center identification code.

The step of generating the SMS message for the billing office center by a Customer Mobile Station includes the step of generating the SMS message to ask for a bill amount of a service account associated with the meter of the customer.

The method further includes the steps of: generating a reply message at the billing office in response to the SMS message, with the reply message including the bill amount; and transmitting the reply message by SMS to the CMS. The method further includes the steps the steps of: receiving the SMS message, including a Customer Mobile Subscriber ISDN (MSISDN), from the CMS by the BOHC through the mobile communications network using short message services (SMS); comparing the MSISDN from the SMS message with a stored MSISDN in a memory of the host computer, with the stored MSISDN associated with the bill amount and the customer; generating, at the host computer, the reply message for the CMS; and transmitting the reply message using the SMS from the host computer to the CMS associated with the customer, with the reply messaging including the bill amount associated with the stored customer MSISDN.

BRIEF DESCRIPTION OF THE SEVERAL VIEWS OF THE DRAWINGS

Preferred embodiments of the invention are disclosed hereinbelow with reference to the drawings.

FIG. 12 is a schematic diagram illustrating an example of a reply message format.

FIG. 13 is a schematic diagram illustrating an example of a reply message.

DETAILED DESCRIPTION OF THE INVENTION

In accordance with FIGS. 1-13, the present invention includes a system and method which employs two physical modules for executing the present invention, using a telecommunications network for remotely and completely wirelessly reading meters in a second non-wireless network of a service application such as a utility. In addition to other subsystems and components providing extra services and functionality in the present invention, the present invention includes a Billing Office module, a GMU, a Customer Mobile Station (CMS), and an Internet-enabled Home User, as shown in FIG. 1.

Figure 1:
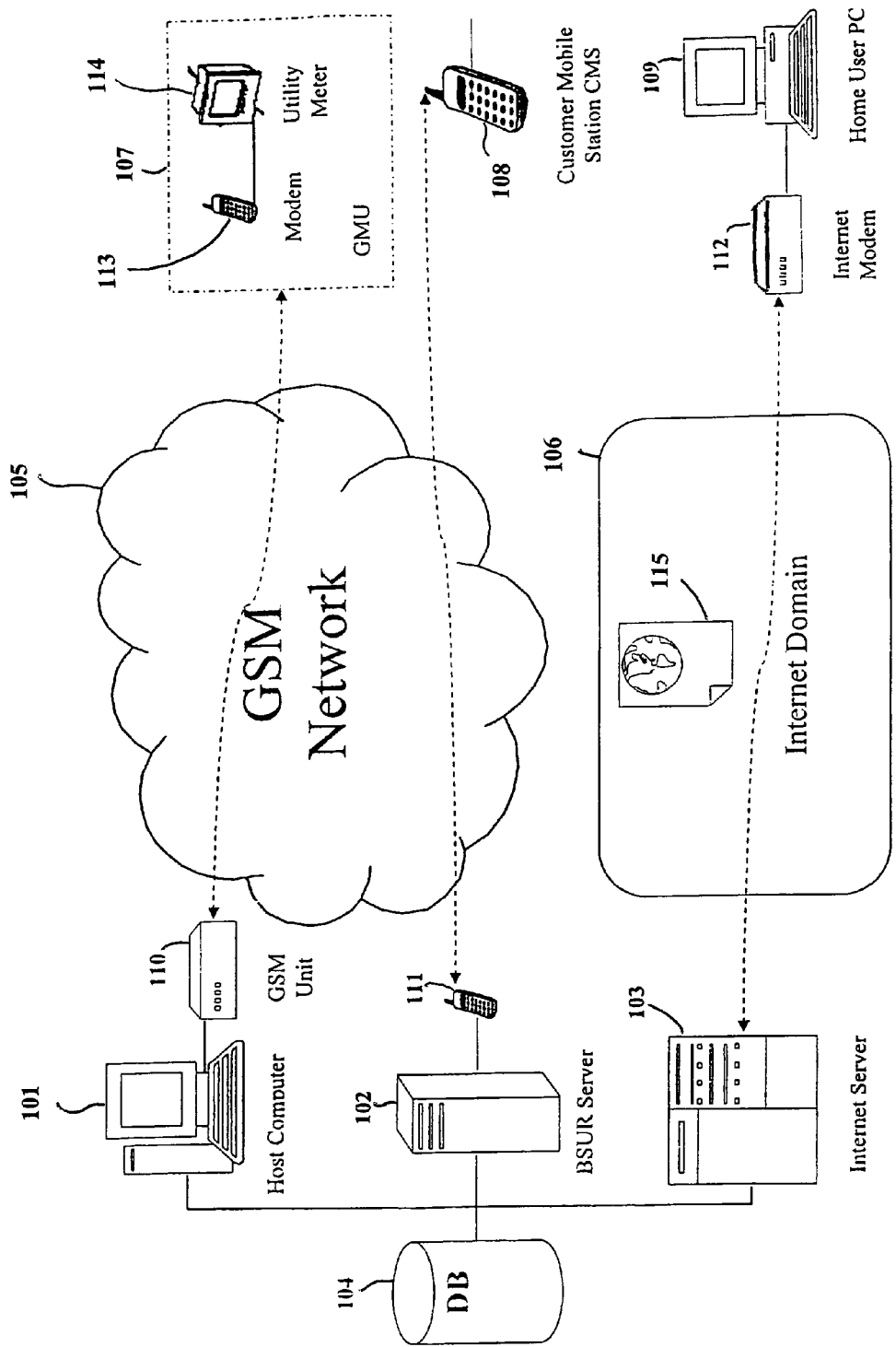
FIG. 1 is a schematic diagram illustrating the system of the present invention.

In an example embodiment shown in FIG. 1, the Billing Office module includes a number of subsystems, such as a Remote Meter Reading (RMR) subsystem in a Host Computer 101, a Bill Sending Upon Request (BSUR) subsystem 102, an Internet subsystem 103, and a database (DB) 104.

The RMR subsystem includes the host computer 101 that is connected to a GSM mobile unit 110 which may interrogate a mobile station 113 in the GSM network 105, with the mobile station 113 being or including a modem of a specific GMU 107, using an SMS message as a message bearer. The host computer 101 stores all data related to consumers in a database 104 and hence all data of the utility meters 114 of the consumers are available. The GSM network 105 may be replaced with a Digital Enhanced Cordless Telecommunications (DECT) network or any other network which supports short messaging service (SMS) and other known messaging services.

At the time the billing office decides to collect data readings from the meters, the host computer 101 submits a SMS message involving a certain code depending on the type of command function required, as illustrated in the example codes shown in Table 1. The query SMS message is received by the GSM unit 107, which starts operating according to the command corresponding to the transmitted code. The GSM unit 107 then sends back either a replying message containing data representing the meter reading, or sends a function acknowledgement or a meter status message through the same network 105. The received data is stored in the specified database 104 to then start the billing operations.

TABLE 1

| Code | Function |
| --- | --- |
| R1113 | Ask for meter reading |
| R1110 | Check meter status |
| C0000 | Shut down the service |
| C0001 | Switch ON the service |
| W2211 | Tampering |

The BSUR subsystem contains a server computer 102 that is connected with a GSM mobile unit 111, which may transmit the bill amount of customers upon their request through the GSM network 105 via SMS to the personal handsets 108 of the customers, or to the meter 114 to be displayed on a display of the meter 114, such as a liquid crystal display (LCD).

The Internet subsystem 103 contains a server computer connected to the Internet Domain 106, such as the entire Internet, network components of the Internet, and/or the World Wide Web. The Internet subsystem 103 contains profiles of the customers, as well as monthly bill amounts for a year, dates of received payments, meter readings, and all information which may be of interest to the customers and accessible by the customers through a personal computer 109 such as a computer of a home user connected to an Internet modem 112 which is in turn connected to the Internet domain 106.

The database 104 feeds each subsystem 101-103 with the required types of data, and may be considered the backbone or backend of the system of the present invention.

The GMU 107 shown in FIG. 1 may be or may include a state of the art digital utility meter 114 for use in the system of the present invention which is compatible with the specifications of the GSM. For example, the GMU 107 may include a 900 MHz GSM modem device 113 for establishing a valid connection with the GSM network 105. GMU 107 is installed in the customer premises. The modem device 113 may directly interface with the meter 114, or may be incorporated into the meter 114.

The CMS 108 may be embodied as a personal handset of the customer, such as a cell phone or any other type of telecommunication device, such as telephones and/or computing devices, which allows a customer to interrogate the BSUR subsystem 102 for requesting a bill amount or any other information associated with the utility account of the customer, such as payment due dates, for example, in the form of audio and/or text messages provided by the personal handset 108 to the customer either audibly and/or visually.

The Internet-enabled Home User includes the personal computer 109 connected with the Internet domain 106 through the Internet modem 112 for valid Internet access, allowing customers to access their profiles visually within the Internet domain 106 through their own computers 109 or any other computers accessed by the customer in any global location.

Figure 2:
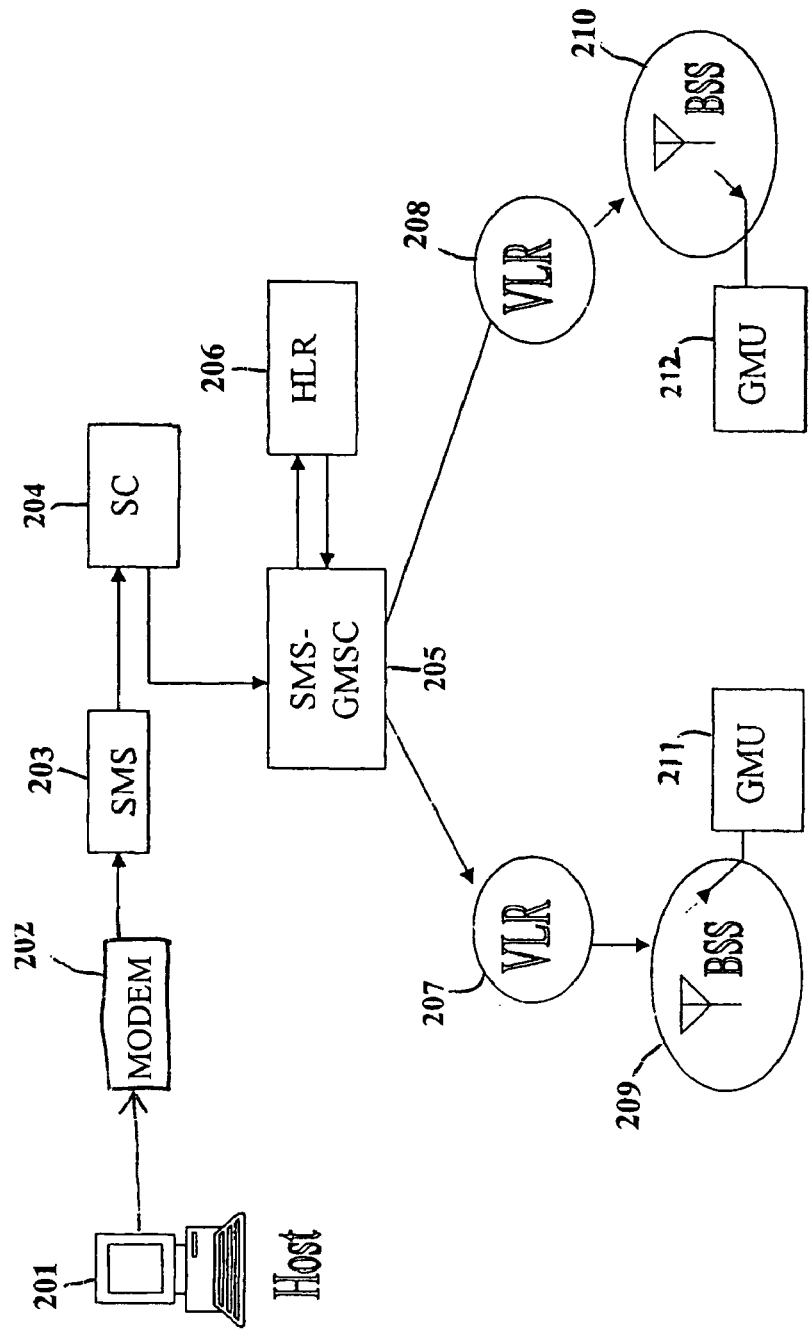
FIG. 2 is a schematic diagram illustrating a host computer at a billing office transmitting a short message to a mobile station in the GSM system, in accordance with telemetry and data application standards.

In connection with querying each remote meter 114, the host computer 101 in FIG. 1 is shown in greater detail in an embodiment of the host computer 201 in FIG. 2. As shown in FIG. 2, the host computer 201 initiates a requesting SMS message 203 including the required type of command as in Table 1. The SMS message 203 is transmitted by a modem 202 to the SMS Center (SC) 204 within the GSM network 105. Then the SMS Center 204 forwards the SMS message 203 to the GSM network 105. Accordingly, a Gateway Mobile Switching Center (SMS-GMSC) 205 sends the instructions or routing information of the SMS message 203 to a Home Location Register (HLR) 206. Finally, the SMS-GMSC 205 sends the addresses associated with the SMS message 203 to the nearest GMU 211, 212 in the vicinity. In particular, the addresses are sent to the nearest Visiting Locations Register (VLR) 207, 208 belonging to the nearest Base Station (BS) 209, 210 of the GMU 211, 212, respectively.

Figure 3:
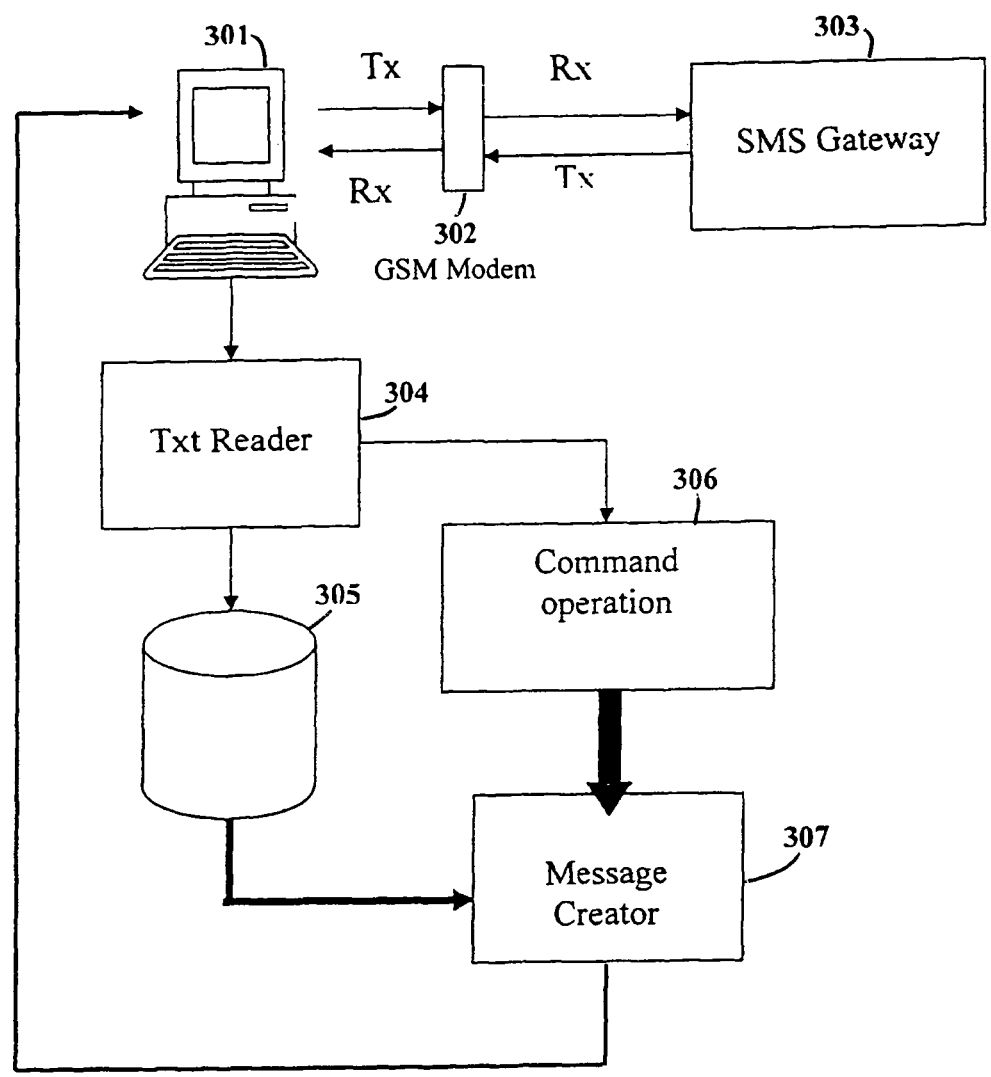
FIG. 3 is a flowchart of operation of the sending and receiving processes at the billing office in accordance with the present invention.

In connection with managing the SMS messages, the host computer 101 is shown in greater detail as a host computer 301 shown in FIG. 3. As shown in FIG. 3, the host computer 301 is in charge of interconnecting with the utility meter 114 through a SMS gateway 303 and through a GSM modem 302, such as the GSM unit 110 in FIG. 1. Therefore, all incoming and outgoing messages must be exchanged through the host computer 301.

At predetermined times, such as once a week or once per month, the host computer 301 begins the query-generation process to send and receive SMS messages to and from a number of GMUs 107 in FIG. 1. Any SMS message transmitted to or received from the GMU 107 via the SMS gateway 303 is also transmitted to a text (TXT) reader 304 associated with the host computer 301. The text reader 304 is able to extract the data from the SMS message and convert the extracted data to a format which ensures system compatibility, for example, to then be stored in a memory or database 305, such as the database 104 in FIG. 1.

Each SMS message includes a command in the body of the message, with examples of such commands shown in Table 1. A Command Operation module 306 receives the extracted data with the command, and the command is stored in the database 305. For example, the command may request the latest meter reading or may switch off the service at the corresponding utility meter associated with the GMU 107.

A message creator 307 is associated with the database 305 and the command operation module 306 to construct a new message containing the required data that was extracted from the database 305, according to the type of received requests. This process is performed at the message creator 307 and sent back to the SMS gateway 303.

Accordingly, for the transmission stage to query the GMUs 107, the present invention generates a desired command in an SMS message, has the command extracted by the text reader 304 and stored in the database 305, has the command processed by a command operation 306 to be forwarded to a message creator 307, and has the created message with the command sent back to the host computer 301 to be sent via the GSM modem 302 and the SMS Gateway 303 to a selected GMU 107.

When the selected GMU 107 responds with a return SMS message through the SMS Gateway 303 and through the GSM modem 302, the host computer 301 has the meter reading or status data extracted by the text reader 304 and stored in the database 305 in a record corresponding to the selected GMU 107.

Figure 4:
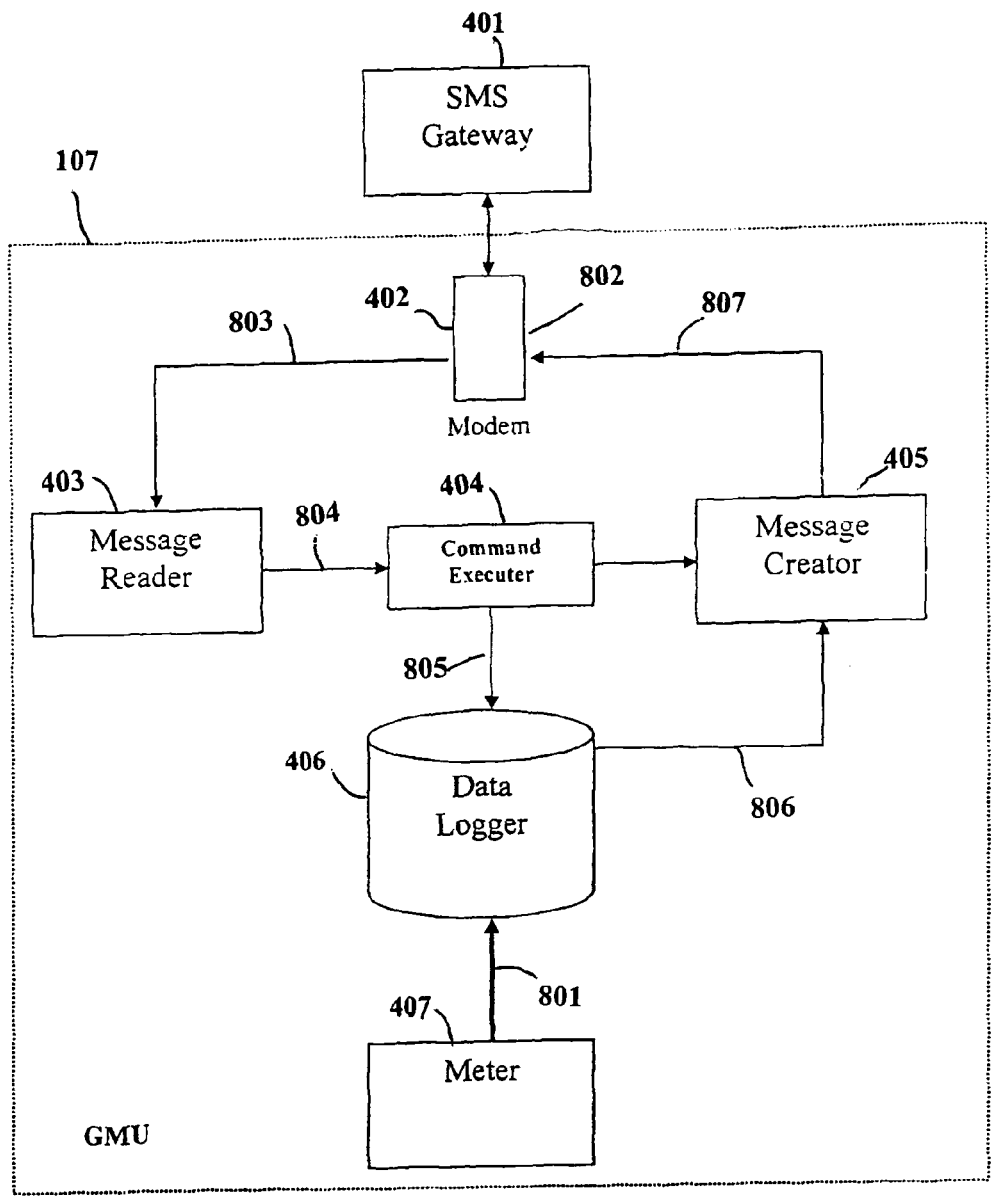
FIG. 4 is a flowchart of operation of receiving/transmitting processes at a digital utility meter unit in accordance with the present invention.

As shown in FIG. 4, at each GMU 107, the meter 407, corresponding to the meter 114 in FIG. 1, stores its readings into a Data Logger 406 periodically in step 801, which ensures that the logger 406 is ready for exporting its stored data when provoked by an incoming SMS message. The incoming SMS message is received by the modem 402 through the SMS gateway 401 in step 802. Then the message reader 403 analyzes the command embedded in the SMS message in step 803, and acts immediately through the command executer 404 in step 804 by ordering the logger 406 to feed the Message Creator 405 in step 805 with the required and requested recent reading. In response, the Message Creator 405 builds a message involving the reading in step 806 using data from the data logger 406, and uses the modem 402 in step 807 for sending the generated message including the reading back to the billing office side of the present invention.

Figure 5:
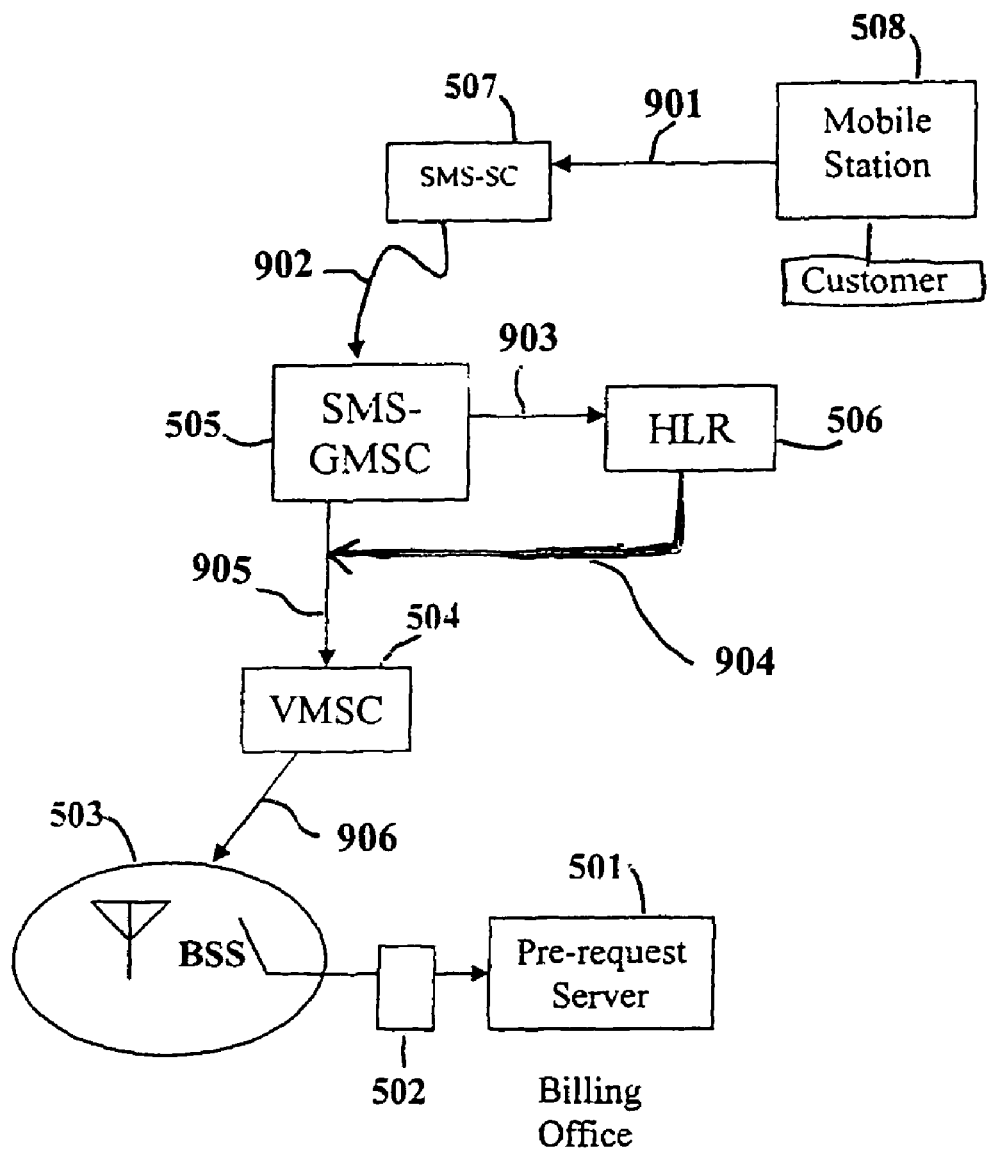
FIG. 5 is a flowchart of operation of a Bill Sending Upon Request (BSUR) method for customers.

FIG. 5 illustrates the process of requesting a bill amount which may be performed by a mobile station 508 upon a customer request using the SMS protocol in the GSM system in accordance with known SMS systems. First, the CMS 508 in FIG. 5, corresponding to the CMS 108 in FIG. 1, generates a SMS request and appends to the short message request the address of a desired SMS service center 507 in step 901. The CMS 508 also appends to the SMS request a Mobile Station International ISDN number (MSISDN) in step 901 which corresponds to an intended receiving module, such as a pre-request server 501, of a billing office for receiving the SMS request. The mobile station 508 then transmits the SMS request to the SC 507 over a small message entity (SME) interface.

The SC 507 then forwards the SMS request to the GSM network 105. The SMS request enters the network via a Short Message Service Gateway Mobile Switching Center (SMS-GMSC) 505 in step 902. Then the SMS-GMSC 505 uses a SMS Mobile Application Protocol (SMS-MAP) to transmit a Send Routing Information for Short Message (SRIFSM) instruction to the HLR 506 in step 903. The HLR 506 uses the MSISDN to access the subscriber record corresponding to billing office 501. The subscriber record contains the location information for the billing office 501. In response to the SRIFSM instruction, the HLR 506 sends an MSC-ID code in step 904; that is, the network address for a Visiting Mobile Switching Center (VMSC) 504 controlling the service area in which the billing office 501 is located. The SMS-GMSC 505 in turn, sends the SMS message to the VMSC 504 in step 905, in which the billing office 501 is located. Then the corresponding VMSC 504 forwards the SMS message in step 906 through a Base Station System (BSS) 503 to indicate that the required modem 502 is in its vicinity. The request is then processed by the pre-request server 501 associated with the billing office. Alternatively, the SMS-GMSC 505 may directly send the SMS message to the VMSC 504 in step 905, and bypass a subscriber record in the network HLR 506, and so bypassing the HLR 506 and bypassing performing steps 903-904.

Figure 6:
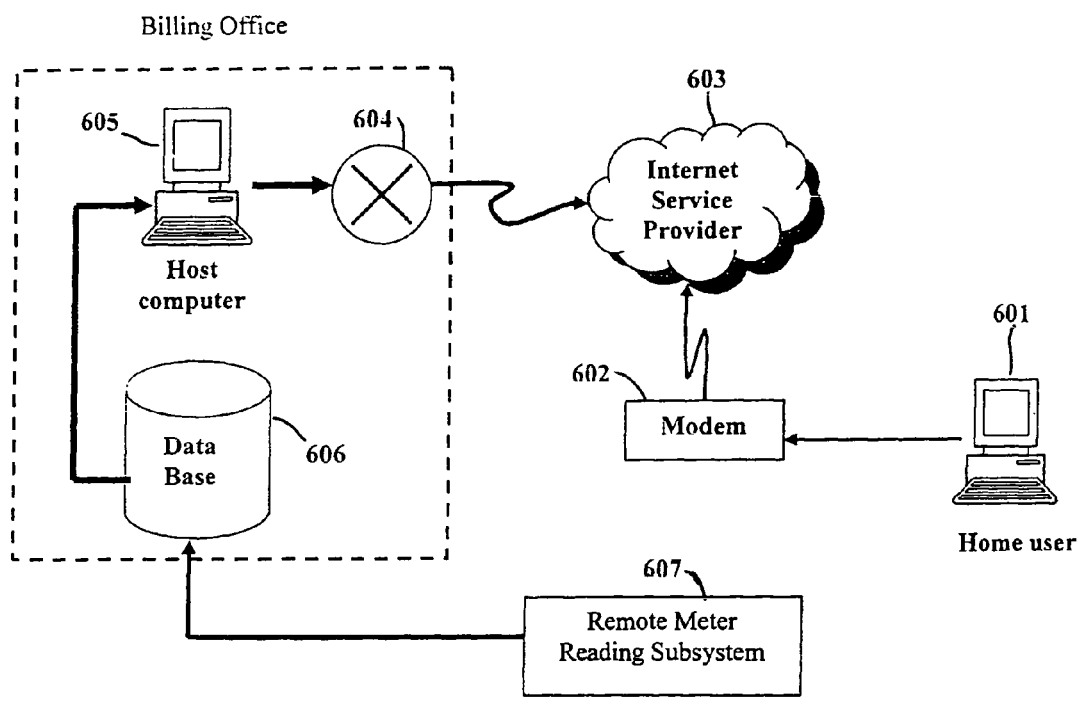
FIG. 6 is a flowchart of operation of the process related to the Billing Office Internet Service.

The present invention includes additional facilities for enhanced functionality and customer service. Utilizing the global Internet network provides more data which SMS cannot offer. FIG. 6 illustrates the Internet subsystem 103 that provides users with data over a web interface which may include a web page 115 in the Internet Domain 106. At the billing office, the database 606, correspond to the database 104 in FIG. 1, may be regarded as the core for all subsystems. Operation starts with the RMR subsystem 607 updating the database 606 with the present readings from a plurality of meters 114. Consequently, the host computer 605 utilizes the resources of the database 606 to start uploading the data in the profiles of the users to a web site through an Internet modem 604, with the web site being maintained with an Internet service provider (ISP) 603 with such profiles having been constructed or accessed by the same host computer 605, corresponding to the host computer 101 in FIG. 1. The data may be located and accessed by users through the Internet domain 106 and accessible through the ISP 603 using a user-friendly interface such as known web browsers that allows reading and monitoring web pages or web sites 115. Lastly, the user can access a web site 115 stored on or accessible via the Internet Domain 106 to locate and access the data normally through the Personal Computer (PC) 601 of the user connected with a suitable modem 602, corresponding to the computer 109 and modem 112 in FIG. 1.

An important issue in transferring the meter data is the addressing strategy. The addressing methods may be applied from start to finish for controlling and guiding the data routing. The present invention benefits from such an addressing strategy through the allowance of group addressing and identification of each GMU 107, especially in the case of per GMU communication through the GSM network.

Figure 7:
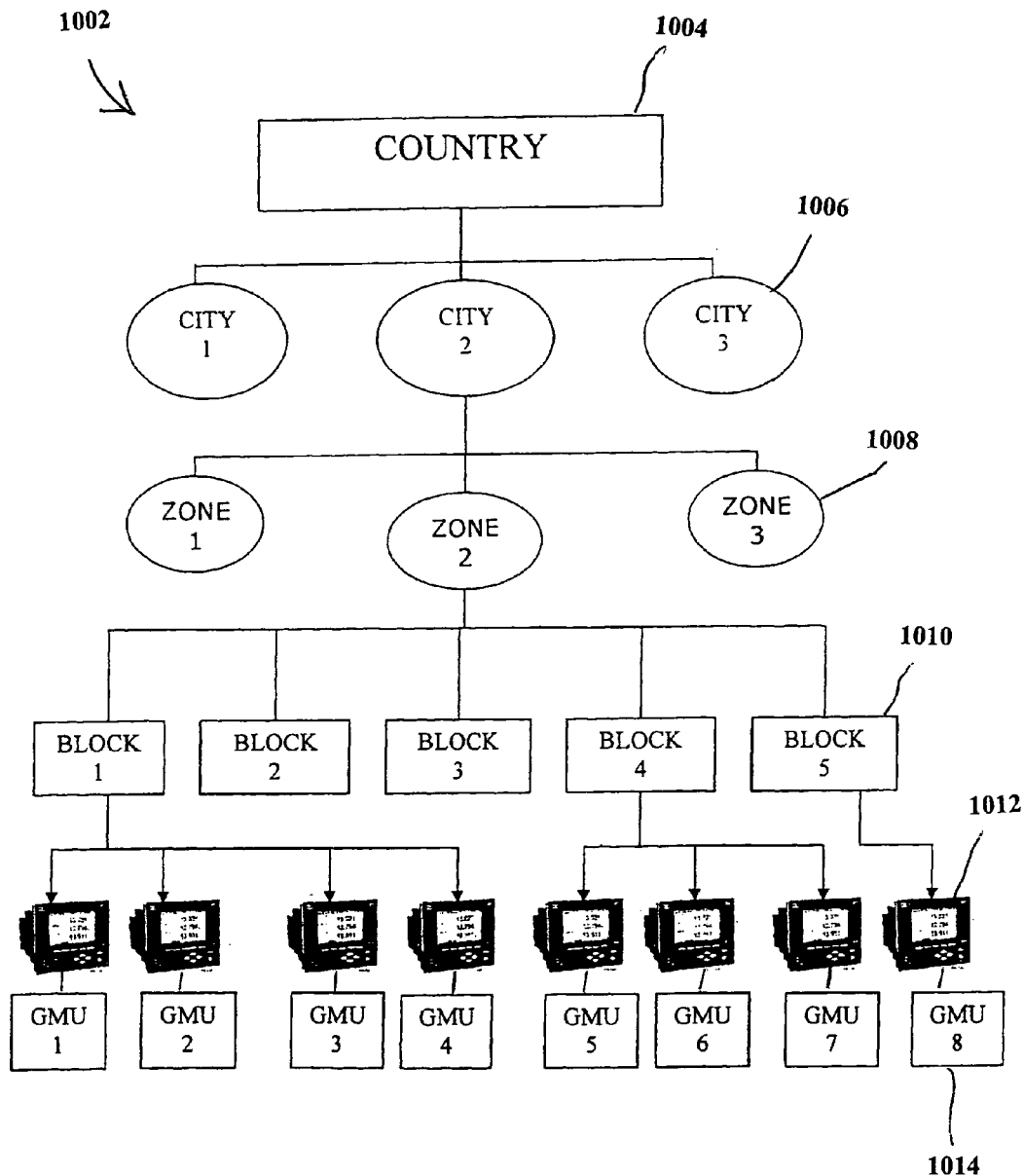
FIG. 7 is a schematic diagram illustrating an Addressing Mechanism used in the present invention.
Figure 8:
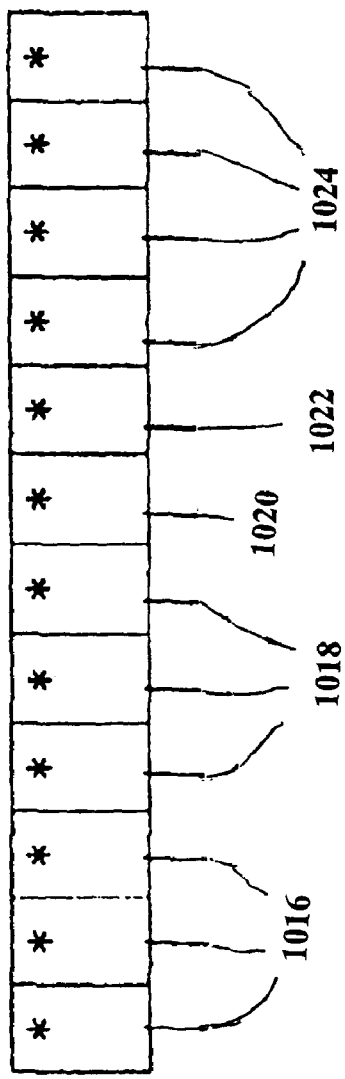
FIG. 8 is a schematic diagram illustrating an example of a unique subscriber number format.

FIG. 7 illustrates an example embodiment of an addressing mechanism or framework 1002 utilized in the present invention for SMS remote unit accessing in a region, such as a country 1004 served by utilities, such that the country 1004 is divided into different sections and cities 1006, with large cities being further subdivided into large areas or zones 1008, then blocks 1010, buildings and even apartments, until the level of the installed utility meter 1012 is reached, with each of the plurality of GMUs 1014 associated with and/or incorporating a respective utility meter 1012, as shown in FIG. 1 Each meter 1012 is assigned a unique identification (ID) number.

One example solution employed in the present invention for such addressing purposes is the use of a Subscriber Identity Module (SIM), in which group or individual communication is performed using a method of sorting data indexed according to a SIM card number associated with each meter with respect to the location of each meter.

In the present invention, the addressing method assigns to each utility meter a unique subscriber number or GMU number, for example, according to a known international standard to be twelve digits long, in which the unique subscriber number represents the meter number within the location of the meter from zone to city to higher levels and finally to the country. In an example embodiment shown in FIG. 8, the unique subscriber number has an international code field 1016, a GSM network operator field 1018, a city number field 1020, a zone number field 1022, and a specific GMU number field 1024.

Figure 9:
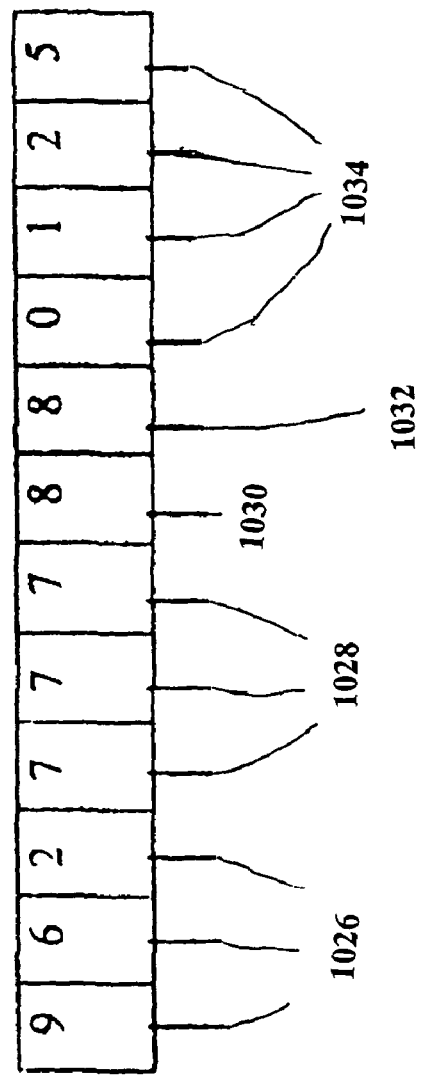
FIG. 9 is a schematic diagram illustrating an example of a unique subscriber number.

In one example, the Kingdom of Jordan may be divided into main cities, with each city being subdivided into main zones, and so on to more local levels until the premises of the customer is reached indicating where the utility meter is installed. For example, if the system of the present invention is to contact a meter with number 125 within the zone eighth circle in Amman, Jordan, GMU number may appear as shown in FIG. 9, having 962 stored in the international code field 1026, 777 stored in the GSM network operator field 1028, 8 stored in the city number field 1030, 8 stored in the zone number field 1032, and 0125 stored in the specific GMU number field 1034. In an example embodiment, the sent message may have the format shown in FIG. 10, listing a city ID and/or zone ID field 1036, an individual meter ID field 1038, and a code operation field 1040 including a command, for example, as shown in Table 1.

Figure 10:
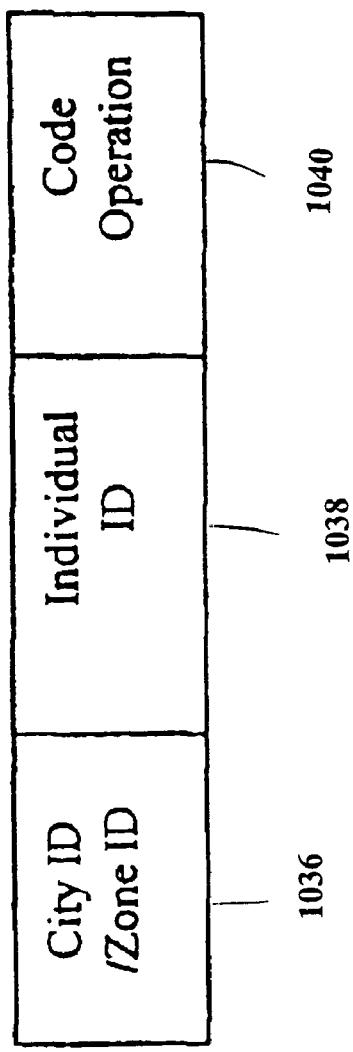
FIG. 10 is a schematic diagram illustrating an example of a sent message format.
Figure 11:
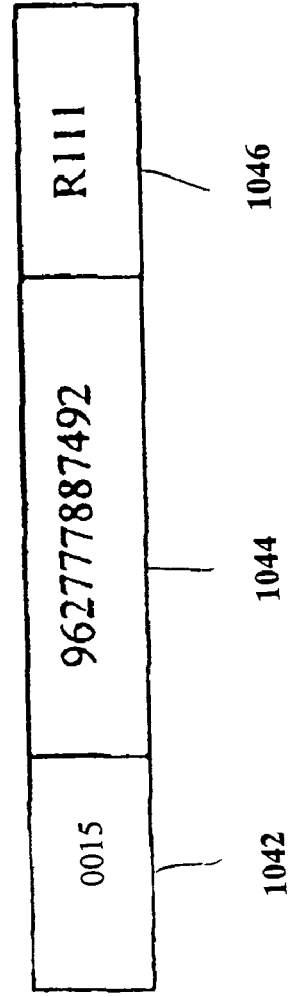
FIG. 11 is a schematic diagram illustrating an example of a sent message.

The following examples illustrate the use of above message format of FIG. 10 in different operations. In a first example, a sent message shown in FIG. 11 is sent from the system of the present invention requesting data from a specific utility meter, in which 0015 in field 1042 indicates calling group number 15, 962777887492 in field 1044 represents only the calling subscriber 7492, and R111 in field 1046 is the code for requesting data. The code R111 may be replaced by code R113 for commanding to receive a meter reading value of the meter of the subscriber 7492, or replaced by code R110 for a value reflecting the meter status, or may be replaced by any other valid code as per Table 1.

The GMU may then send a reply message having a replying format shown in FIG. 12, listing a city ID and/or zone ID field 1048, an address ID field 1050, and the requested meter reading field 1052 in respond to the sent command.

In a second example, the reply message may have the format shown in FIG. 13, where 0015 in field 1054 indicates calling group number 15, 962777887492 in field 1056 represents the calling subscriber 7492 only in an answer message, and 06821359 in field 1058 represents the recent reading of the selected meter.

When the utility company, such as an electricity board, sends a message frame to a certain group, each remote unit has a nominal time in which to reply, for example, one hour, so that the received remote meter readings are substantially current.

In various embodiments described herein, the system and method remotely monitor a plurality of meters in a non-wireless service network using a wireless system separate from the non-wireless service network. The system includes a query computer for generating a query message including a command to a selected meter of the plurality of meters, for processing a reply message from the selected meter, with the reply message including a response to the command from the selected meter, and for storing the response associated with the selected meter in a memory; and a wireless telecommunications network using a predetermined communication protocol for transmitting completely wirelessly the query message from the query computer to the selected meter and for transmitting the reply message completely wirelessly from the selected meter to the query computer, for remotely and wirelessly monitoring at least the selected meter in the non-wireless service network. The predetermined communication protocol is the short messaging service (SMS) protocol. The query message and the reply message are SMS messages. The response in the reply message includes data in a SMS message in a Global System for Mobile Communications (GSM) format. The non-wireless service network is a utility supply network for applications selected from the group of residential applications and industrial applications. The utility supply network is selected from the group of electrical, water, gas, commodity, or goods. The wireless telecommunications network is selected from the group of a Global System for Mobile Communications (GSM) network, a Digital Enhanced Cordless Telecommunications (DECT) network, or a wireless network which supports short messaging service (SMS) and messaging services.

A method collects and transfers utility meter reading data from a utility network completely wirelessly through a mobile communication network, with the utility network being non-wireless and immobile and located within the vicinity of the service area of the mobile communication network. The method includes the steps of generating, at a computing device, a query short message services (SMS) message for a meter, with the computing device being external to the mobile telecommunications network using an SMS infrastructure; identifying a selected wireless device in the mobile telecommunications network with the wireless device associated with the meter, with the selected wireless device accessible by the SMS infrastructure to transmit and receive SMS messages using a service area identification code and a mobile station code; transmitting from the computing device the query SMS message wirelessly to a network switching center (SC) associated with the service area identification code, wherein the SMS message is transmitted through a network Home Location Register (HLR); and forwarding the query SMS message from the network switching center to the selected wireless device; and sending telemetry associated with the meter from the wireless device to the computing device, thereby remotely and completely wirelessly monitoring the meter in the non-wireless and immobile utility network.

The method further includes the steps of: generating, at the computing device, the query SMS message including a identification number associated with the meter; transmitting the query SMS message from the computing device to the SMS center; and generating, in the SMS center, the query SMS message with the service area identification code and the mobile station code.

A method processes a query message from a host computer by a Global System for Mobile (GSM) communications based meter unit (GMU) associated with a meter in a non-wireless network. The method includes the steps of: receiving the query message transmitted wirelessly from the host computer at the GMU by a GSM modem using a short message service (SMS), with the message including a service area identification number and a GMU identification code; analyzing, at the GMU, a body of the message for a code command; performing an action at the meter corresponding to the received code command; generating a reply message at the GMU for a billing office host computer (BOHC), with the reply message including information responding to the received code command; transmitting the reply message with the GMU identification code as a SMS message to a SMS service center; reformatting, in the SMS service center, the reply message to be associated with the service area identification number and the GSM identification code; and transmitting the reformatted reply message to the BOHC.

The step of performing the action corresponding to the code command is selected from the group of: extracting a recent meter reading; switching ON/OFF a service associated with the meter; and acknowledging meter status. The method further includes the steps of: periodically transmitting the query message from the host computer to the GMU; and periodically transmitting the reformatted reply message containing a recent meter reading to the BOHC. The steps of periodically transmitting are performed each week or performed once per month.

The method further includes the steps of: receiving the reformatted reply message at the BOHC; extracting a meter reading, the service area identification number, and the GMU identification code from the reformatted reply message; and storing data the meter reading in a database according to the GMU identification code.

A method performs a Bill Sending Upon Request (BSUR) operation for customer billing for service to meters in a non-wireless network through a mobile communications network using short message services (SMS) routing to a billing office center of the non-wireless network. The method includes the steps of: generating a query for the billing office center by a Customer Mobile Station (CMS) associated with a customer of the service using a SMS message which includes a service area identification number and a billing office center identification code; transmitting from the CMS the SMS message wirelessly to a network Switching Center (SC) associated with the service area identification code, with the message being transmitted though a network Home Location Register (HLR), bypassing a subscriber record in the network HLR; and forwarding the SMS message from the SC to the billing office.

The method further includes the steps of: assigning an identification of the billing office center for receiving the SMS message; generating, at a Customer Mobile Station (CMS), the SMS message including the identification; transmitting the SMS message including the identification code from the CMS to a short message service center (SMSC); and generating, in the SC, the message for the billing office center associated with the identification of the billing office and the billing office center identification code.

The step of generating the SMS message for the billing office center by a Customer Mobile Station includes the step of generating the SMS message to ask for a bill amount of a service account associated with the meter of the customer. The method further includes the steps of: generating a reply message at the billing office in response to the SMS message, with the reply message including the bill amount; and transmitting the reply message by SMS to the CMS. The method further includes the steps the steps of: receiving the SMS message, including a Customer Mobile Subscriber ISDN (MSISDN), from the CMS by the BOHC through the mobile communications network using short message services (SMS); comparing the MSISDN from the SMS message with a stored MSISDN in a memory of the host computer, with the stored MSISDN associated with the bill amount and the customer; generating, at the host computer, the reply message for the CMS; and transmitting the reply message using the SMS from the host computer to the CMS associated with the customer, with the reply messaging including the bill amount associated with the stored customer MSISDN.

While the preferred embodiment of the present invention has been shown and described herein, it will be obvious that such embodiment is provided by way of example only. Numerous variations, changes and substitutions will occur to those skilled in the art without departing from the invention herein. Accordingly, it is intended that the invention be limited only by the spirit and scope of the appended claims.

What is claimed is:

1. A method for collecting and transferring utility meter reading data from a utility network completely wirelessly through a wireless telecommunications network, with the utility network being non-wireless and immobile and located within the vicinity of the service area of the wireless telecommunications network, and wherein the utility network includes a plurality of meter units, said meter units including a meter for selectively performing an action in response to receiving a command, a wireless modem for receiving messages from, and transmitting messages to, a wireless telecommunications network; a message receiver coupled to said modem for analyzing said wireless message for identifying a command present in said message; a command executer coupled to said message receiver for receiving and performing an action in response to said command; and a message creator for generating a reply message in SMS protocol and supplying said reply message to said modem for transmission to the wireless telecommunications network, the method comprising the steps of:

generating, at a computing device, a query short message services (SMS) message for a meter unit, with the computing device being external to the wireless telecommunications network using an SMS infrastructure;

selecting at least one meter unit to transmit and receive an SMS message using a service area identification code and a mobile station code;

transmitting from the computing device the query SMS message wirelessly to a network switching center (SC) associated with the service area identification code, wherein the SMS message is transmitted through a network Home Location Register (HLR);

forwarding the query SMS message from the network switching center to the wireless modem of at least one selected meter unit; and sending telemetry associated with the meter from the wireless modem of said at least one selected meter unit to the computing device, thereby remotely and completely wirelessly monitoring the meter in the non-wireless and immobile utility network.

2. The method in claim 1, further comprising the steps of:

generating, at the computing device, the query SMS message including a identification number associated with the at least one meter unit;

transmitting the query SMS message from the computing device to the SMS center; and generating, in the SMS center, the query SMS message with the service area identification code and the mobile station code.

* * * * *